United States Patent [19]

Lee

[11] Patent Number: 4,754,537
[45] Date of Patent: Jul. 5, 1988

[54] PROCESS OF MAKING A CLOTH TAKEUP MANDREL

[75] Inventor: Curtis L. Lee, Fayetteville, N.C.

[73] Assignee: Burlington Industries, Inc., Greensboro, N.C.

[21] Appl. No.: 602,745

[22] Filed: Apr. 23, 1984

[51] Int. Cl.$^4$ .............................................. B29C 61/00
[52] U.S. Cl. .................................. 29/148.4 D; 29/123; 29/447; 264/230; 264/DIG. 68; 264/DIG. 71
[58] Field of Search ....... 264/230, DIG. 68, DIG. 71; 29/123, 148.4 D, 447

[56] References Cited

U.S. PATENT DOCUMENTS

| | | | |
|---|---|---|---|
| 1,168,188 | 7/1916 | Gammeter . | |
| 1,594,907 | 2/1926 | Grundler et al. . | |
| 1,801,396 | 4/1931 | Thatcher | 264/DIG. 71 |
| 1,981,334 | 11/1934 | Schmalz | 264/230 |
| 2,027,962 | 1/1936 | Currie | 264/230 |
| 2,285,340 | 6/1942 | Lockwood | 29/123 |
| 2,528,116 | 10/1950 | Clemson | 29/123 |
| 2,940,388 | 6/1960 | Schaefer | 29/123 |
| 3,482,607 | 4/1968 | Villani et al. | 139/304 |
| 3,663,678 | 5/1972 | Miller | 264/230 |
| 3,713,601 | 10/1973 | Buhrman et al. | 242/68.6 |
| 3,953,059 | 4/1976 | Carroll et al. . | |
| 4,021,004 | 9/1977 | Poeat | 242/118.6 |
| 4,083,513 | 10/1978 | Pfarrawaller | 242/118.6 |
| 4,128,215 | 12/1978 | Underwood | 242/118.61 |
| 4,198,008 | 1/1980 | Krautwald | 242/68.6 |
| 4,384,945 | 4/1983 | Sword | 204/181 |
| 4,390,139 | 6/1983 | Alexander | 242/66 |

*Primary Examiner*—James Lowe
*Attorney, Agent, or Firm*—Nixon & Vanderhye

[57] ABSTRACT

A cloth take-up mandrel is fabricated by cutting pipe of a thermoplastic polymeric material (e.g. PVC) to a desired length, heating the ends of the pipe to a temperature at which the polymeric material softens (as by insertion into a bath of glycerine), inserting end caps into the thus softened pipe ends (having a cross-sectional dimension greater than the dimension of the pipe), and cooling the ends with the end caps inserted therein. The invention avoids problems such as splintering associated with conventional wooden mandrels.

8 Claims, 1 Drawing Sheet

PROCESS OF MAKING A CLOTH TAKEUP MANDREL

FIELD OF THE INVENTION

This invention relates to the field of textiles, and in particular to a safe, easily-fabricated take-up mandrel for use on a cloth weaving loom.

BACKGROUND OF THE INVENTION

Fabric is formed from fibrous raw material on a loom. As the fabric is formed it is moved by take-up mechanisms over guiding surfaces and, eventually, caused to be wound on a take-up roll positioned on a cloth take-up stand. When a desired amount of fabric has accumulated on the roll, the roll is removed from the cloth take-up stand and taken to a quality control or grading station. The cloth, of course, is ultimately removed from the roll and the roll is returned to the loom to be reused.

Conventional take-up rolls are made of wood, either as a solid or hollow cylinder having (end) caps (usually metal) fitted in the ends thereof and machined for positioning on the cloth take-up stand. A safety problem is inherent in the use of wooden take-up rolls, however, inasmuch as the rolls splinter with age and use, posing serious safety problems to those workers who handle them on a regular basis. Further, wooden rolls are generally relatively heavy and their life-span is not always as long as might otherwise be desired. Thus, a mandrel which improved on these prior art drawbacks, and which was additionally inexpensive and easily fabricated, would be useful to the textile industry.

SUMMARY OF THE INVENTION

This invention provides a method whereby safe (non-splinterable) mandrels may be inexpensively and easily fabricated, which madrels are made from pipe made of a thermoplastic material such as polyvinyl chloride (PVC). The polymer material from which the pipe is fabricated is chosen to have a softening point below 400° C., advantageously below 350° C. "Softening point" is here intended to mean tne temperature (or temperature range) at which the thermoplastic pipe is sufficiently soft, pliable and manipulable to permit an object (such as an end cap) having cross sectional dimensions (e.g. diameter) slightly larger than the inside diameter of the unheated pipe to be inserted in the pipe end. Each end of the pipe is heated until the softening point is reached, and an end plug or cap having a diameter slightly greater than the room temperature inner diameter of the pipe is then inserted therein. The end of the pipe is then quenched by cooling so that, as the pipe cools down, it contracts onto and holds the end cap securely. The result is a cloth take-up roll which can immediately be placed on the cloth take-up stand of a loom, which does not splinter and which is believed to be relatively long-lived.

It is an object of this invention to provide a cloth take-up roll which does not splinter.

It is further an object of this invention to provide a cloth take-up roll which is inexpensive and easily fabricated.

It is further an object of this invention to provide a method for fabricating such a cloth take-up roll.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which.

DESCRIPTION OF THE PREFERRED EMBODIMENTS

Figure 1:
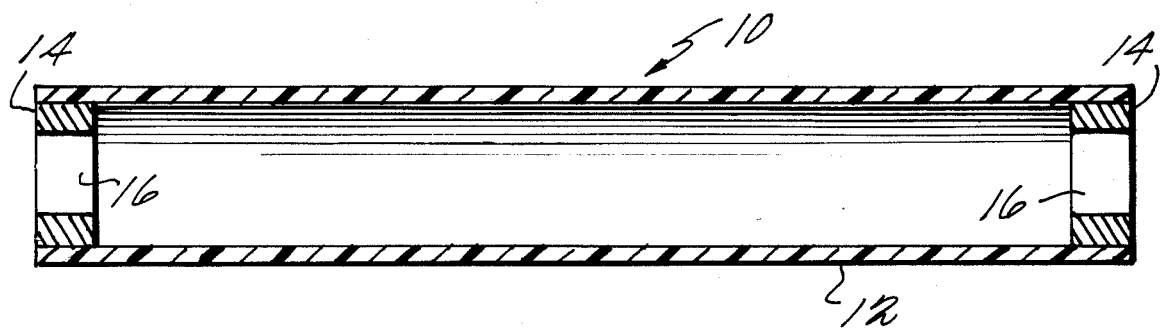
FIG. 1 is a longitudinal section through the cloth take-up roll fabricated according to the invention.

The terms "mandrel" and "take-up roll" are used synonymously herein, as are the terms "end cap" and "end plug".

The present invention provides a method which can generally be described as a process for fabricating a cloth take-up roll, comprising the steps of:

heating the end of a pipe fabricated of a thermoplastic polymeric material to a temperature at which said polymeric material softens;

inserting an end cap into the thus softened pipe end;

cooling said pipe end; and repeating the above steps on the other end of the pipe.

The present invention also provides a cloth take-up roll fabricated according to the above method.

The type of material from which the pipe is made is a thermoplastic, i.e. a plastic that reversably softens and hardens on heating and cooling. Thermoplastics soften over a range characteristic of the particular polymer from which the thermoplastic is made and its properties (e.g. the polymer density). Particularly favored is polyvinyl chloride which is used extensively in commercial articles such as pipe, skylights, valves, tank linings, etc. Good results have been obtained using polyvinyl chloride pipe of the type commonly used for water pipes and electrical conduits. This type of pipe is readily commercially available from numerous sources such as Charlotte Pipe and Foundry, Charlotte, N.C. The pipe is made in numerous stock lengths and diameters and can be custom cut to order in special lengths if needed for fabricating the take-up rolls of this invention.

The method of the present invention is conceptually simple. A length of (e.g. polyvinyl chloride) pipe equivalent to the length of cloth take-up roll desired is cut and then one of its ends is heated to a point at which the polyvinyl chloride becomes soft and pliable. It is at this point that an oversized object such as an end cap having cross-sectional dimensions slightly larger than the inside diameter of the pipe can be forced into the pipe. Following insertion the end is allowed to cool, resulting in the polyvinyl chloride contracting onto the end cap such that it grips the end cap securely and holds it. This operation is then repeated on the other end of the pipe, and the cloth take-up roll is then ready for placement on the cloth take-up stand. No adhesives or mechanical retainers are required said in holding the end cap once it has been inserted and the pipe has been cooled. The method is therefore quite simple and unencumbered by auxiliary processes and apparatus.

The pipe ends may be heated in any manner which will achieve softening, such as an oven or even a direct flame, although such methods of heating are cumbersome to implement. It has been discovered that the pipe end may advantageously be softened by heating in an organic liquid having a boiling point higher than that at which the pipe material softens sufficiently to permit inserting a slightly oversized end cap.

Seventy-seven inch lengths of PVC plastic pipe having a three-inch inner diameter and a wall thickness of about ⅛ inch have been utilized to form mandrels. Two end caps, each two inches long and having an outer diameter of 3 ⅛ inches (i.e. one-eighth inch larger than the inside diameter of the pipe) were chosen for insertion. Glycerin (boiling point 554° F., autoignition point 698° F.) was heated to a temperature of 300° F. and one end of the PVC pipe was inserted therein to a depth of about 3 to 5 inches. After heating for a period of approximately 30 seconds, the pipe end was withdrawn and the end cap was inserted therein by simply placing the end cap on the floor and manually forcing the pipe in its softened condition down over it. The pipe end thus containing the inserted end cap was quenched by immersing in room temperature water for approximately 30–45 seconds. The identical sequence of operations was then performed on the opposite end of the pipe, resulting in a mandrel which was ready for use in cloth take-up operations. Shafts are inserted into opening 16, and cloth is taken upon the mandrel 10. Cloth may be initially attached to the mandrel as by, for example, taping. Other methods of attachment allowing facile removal of cloth from the mandrel following take-up operations can similarly be used.

In the above example, the use of glycerin in conjunction with PVC represents a preferred embodiment from the safety stand-point inasmuch as the flash point of glycerin is 320° F., well above the softening temperature (300° F.) used. It is, however, believed that additional organic liquids would be entirely suitable for use in the invention. For example, the following is a table of liquids which have autoignition and boiling points suitable for use with PVC pipe.

TABLE 1

Liquids Useful For Softening PVC Pipe

| Liquid | Flash Point (°F.) | Boiling Point (°F.) | Auto Ignition (°F.) |
| --- | --- | --- | --- |
| Glycerin | 320 | 554 | 698 |
| Diethylene Glycol | 255 | 473 | 444 |
| Triethylene Glycol | 351 | 545 | 700 |
| Dimethyl Phthalate | 295 | 543 | 1033 |

Figure 2:
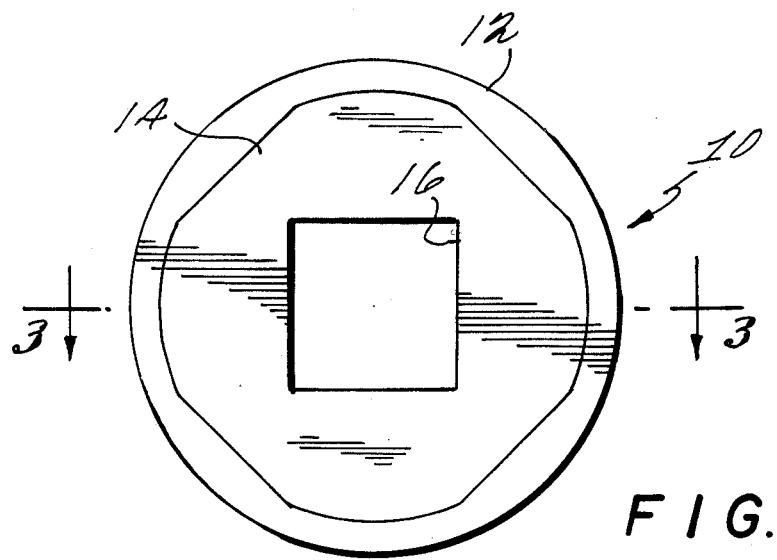
FIG. 2 is an end view of the cloth take-up roll illustrated in FIG. 1.
Figure 3:
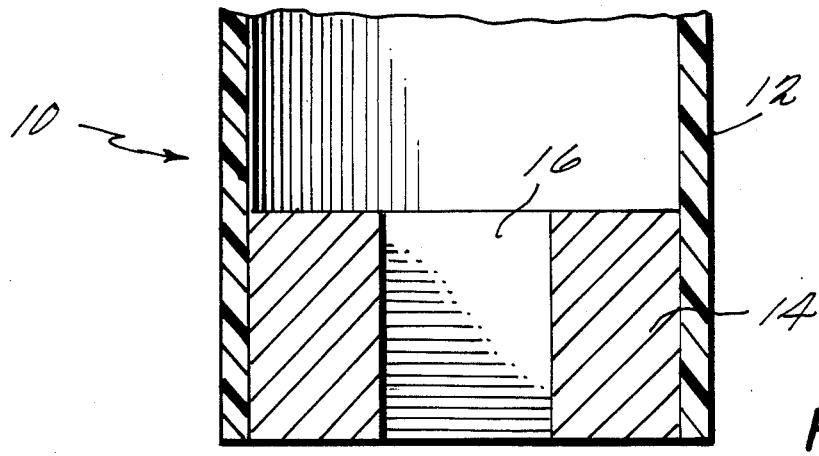
FIG. 3 is a fragmentary sectional view taken on line 3—3 of FIG. 2.

FIG. 1 shows in section a finished fabricated cloth take-up roll. The take-up roll is generally designated as 10 and comprises pipe wall 12 and end cap 14 having orifice 16 therein for fitting onto the male stud in a cloth take-up stand which turns in the same proportion as cloth is being woven. FIG. 2 is an end view of FIG. 1 and shows one type of end cap suitable for use in the invention, which cap the inventor has employed with good success. End cap 14 comprises wall 18 which defines an opening 16 which is preferably polygonal in shape, and it is to be noted that the end cap cross-section may deviate slightly from perfectly circular (e.g. beveled octagonal, as shown in the figure) to provide holding points which facilitate gripping by the PVC pipe on cooling. For the sake of completeness, FIG. 3 shows a side elevational view of end cap 14.

Thus those skiled in the art will recognize that the invention provides a cloth take-up roll which is light, which is not subject to unsafe splintering as are conventional wooden take-up rolls, and which is believed to be much more long lived than its wooden counterpart. Importantly, pipes fabricated of any thermoplastic material can be used in the invention. Although PVC has been used as an exemplary and preferred embodiment, the invention is not to be construed as limited to PVC alone.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A process for fabricating a cloth take-up roll, comprising the steps of:
    (a) heating the end of a pipe fabricated of a thermoplastic polymeric material to a temperature at which said polymeric material softens;
    (b) inserting an end cap into the thus softened end, said end cap having a cross-sectional dimension slightly greater than the inside diameter of said pipe;
    (c) cooling said pipe end; and
    (d) repeating said steps (a), (b), and (c) on the other end of said pipe.

2. The process of claim 1 wherein said thermoplastic material is polyvinyl chloride.

3. The process of claim 1 wherein said heating is effected by placing said pipe end in an organic liquid heated to a temperature above that necessary to soften said thermoplastic material.

4. The process of claim 3 wherein said organic liquid is glycerin.

5. The process of claim 4 wherein said thermoplastic material is polyvinyl chloride.

6. The process of claim 3 wherein said thermoplastic material is polyvinyl chloride.

7. A process as recited in claim 1 wherein each end cap has a polygonal shaped opening therein concentric with said pipe.

8. A process as recited in claim 7 comprising the further steps of inserting shafts in said end cap openings, and taking cloth up on said mandrel.

* * * * *